April 25, 1961  S. W. VAN HORN  2,981,809
TRACTOR SAFETY CONTROL

Filed July 2, 1959  2 Sheets-Sheet 1

INVENTOR
Sterling W. VanHorn
BY
ATTORNEY

April 25, 1961  S. W. VAN HORN  2,981,809
TRACTOR SAFETY CONTROL
Filed July 2, 1959  2 Sheets-Sheet 2

INVENTOR
Sterling W. Van Horn
BY
ATTORNEY

United States Patent Office 2,981,809
Patented Apr. 25, 1961

2,981,809

TRACTOR SAFETY CONTROL

Sterling W. Van Horn, 639 Jefferson Ave.,
Scranton 10, Pa.

Filed July 2, 1959, Ser. No. 824,740

8 Claims. (Cl. 200—61.5)

This invention relates to a safety device for use with motor vehicles, and more particularly to a device for interrupting the ignition circuit of a tractor or similar automotive vehicle, when the tractor tilts beyond a predetermined angle with respect to the horizontal, or the tractor becomes involved in a collision or is subjecetd to sudden shock due to careless operation.

An object of my invention is to provide an improved arrangement for interrupting the ignition circuit of a tractor or similar automotive vehicle.

Another object of my invention is to provide an improved ignition circuit interrupter having inter-locking means incorporated therein, whereby when the circuit is opened or closed by reason of tilting of the tractor beyond the predetermined angle for which the interrupter is set to operate, the interrupter cannot be re-set to operating position until the tractor is returned to a safe operating angle.

Yet another object of my invention is to provide an improved ignition circuit interrupting device, including a pendulum member, constructed and arranged to operate under the combined influence of gravity and magnetic attraction of magnet means associated therewith.

Still another object of my invention is to provide an improved ignition circuit interrupting arrangement wherein means are provided for varying the angle of tilt at which the ignition circuit is automtically opened.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions, which for the purpose of explanation, have been made the subject of illustration.

Figure 1:
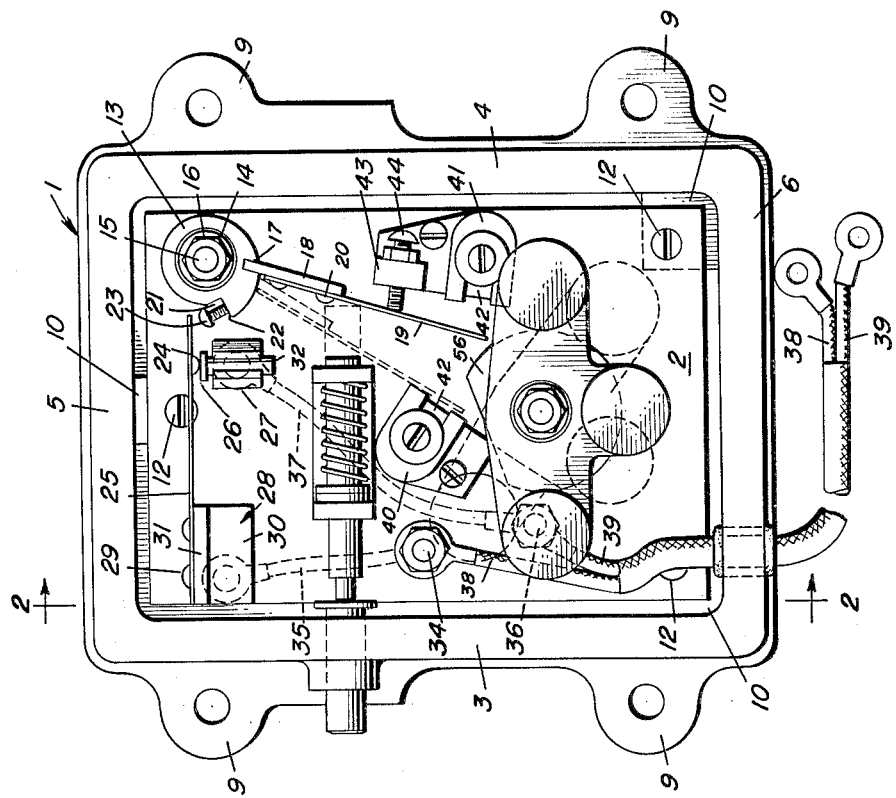
Figure 1 is a front elevational view of the safety device, with the housing cover removed, the switch being shown in its normally operative closed position.
Figure 3:
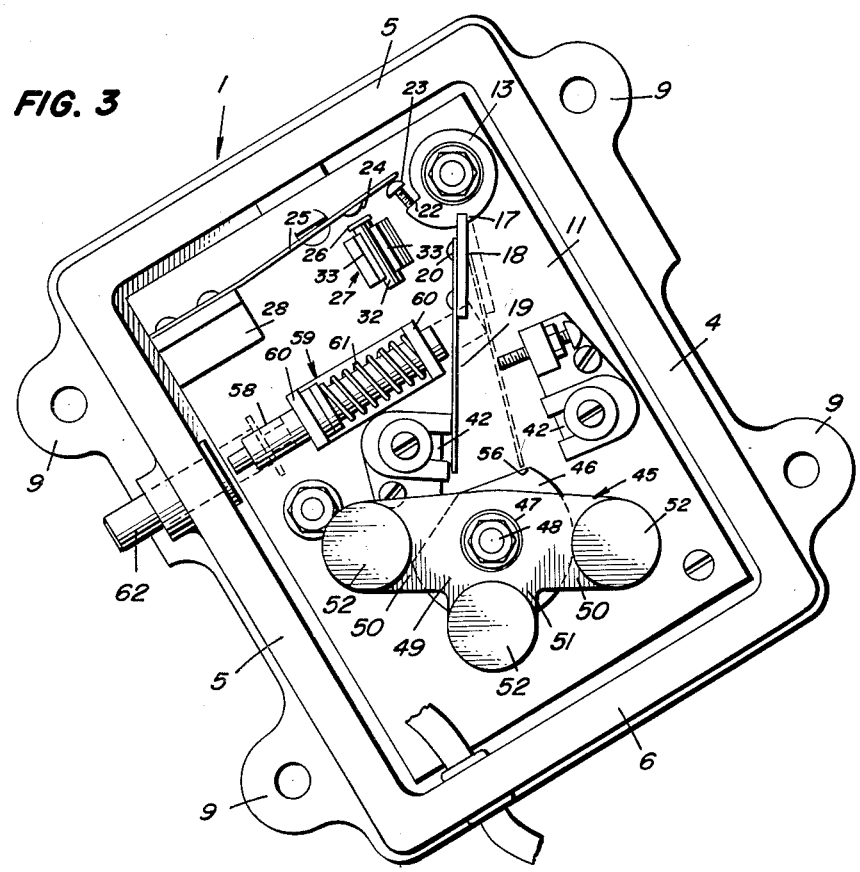
Figure 4:
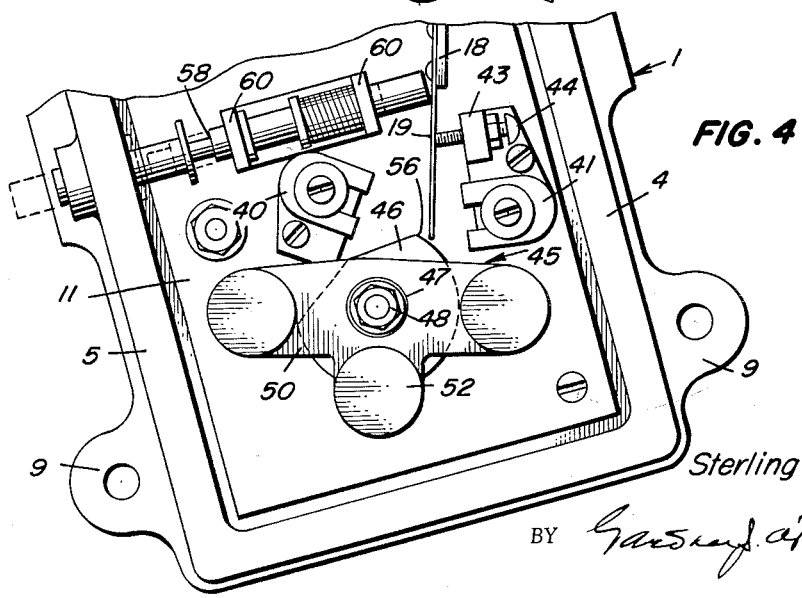

Fig. 3 is a view similar to Fig. 1, showing the device tilted at an angle greater than the predetermined safe operating angle for which the interrupter has been set to operate, the switch being shown in the off position; and Fig. 4 is a view similar to Fig. 3, showing the device tilted at an angle less than the predetermined safe operating angle, the pendulum associated with the interrupter mechanism being shown in the re-set position.

The safety device of the present invention comprises essentially, a generally rectangular shaped container or housing for the operative elements of the device, which elements comprise a pendulum assembly, a pair of electrical contacts, a pair of permanent magnets, and an adjustable governor mechanism, mounted upon a panel or sheet of insulating material positioned within the housing in spaced parallel relation with respect to the plane of the bottom thereof. The pendulum assembly includes a steel pendulum, pivotally supported between the apposed poles of the magnets, the assembly being constructed and arranged whereby, when the pendulum moves in the direction of one of the magnets the electrical contacts are permitted to close, and when the pendulum moves in the direction of the other magnet the contacts are opened. The governor mechanism, which is pivotally mounted below the free end of the pendulum, includes an adjustable cam member adapted to obstruct movement of the pendulum from contact closing position to contact opening position, during the period that the angle of inclination of the housing with respect to the horizontal is less than a predetermined angle. When the angle of inclination of the housing becomes equal to or greater than the predetermined angle, the pendulum is free to move to its contact opening position. A re-set mechanism comprising a spring-biased plunger is provided, whereby the pendulum can be returned to and held in its normal position, that is to say, the position in which the contacts are permitted to close, after the angle of inclination of the housing becomes less than the predetermined angle. Since the electrical contact members are connected in series with one side of the ignition circuit, this circuit will be opened when the vehicle tilts beyond the predetermined safe operating angle.

Referring to the drawings, and more particularly to Fig. 1, there is shown a container or housing, designated generally by numeral 1, including a bottom 2, sides 3 and 4, ends 5 and 6, and a cover member 7 removably secured to the housing by means of machine screws 8, threadable into openings in the top edges of the side and end members. The container is preferably formed from a light weight metal, for example, aluminum, magnesium, or alloys thereof, as by casting, the sides 3 and 4 being formed with integral apertured ears or lugs 9, adapted to receive suitable fastening means, not shown, whereby to secure the container to a vehicle. Within the container, at each of the corners formed by the sides 3 and 4 and the end 6, and at a point midway of the end 5, there is provided a rectangular shaped platform 10 extending upwardly from the plane of the bottom 2, the platforms being adapted to support a sheet or panel of insulating material 11 thereon, in spaced relation with respect to the bottom of the container, the panel being secured to the platforms by means of screws 12, or other suitable fastening devices.

As indicated hereinabove, the operating elements of the safety device, including the pendulum assembly, electrical contacts, permanent magnets, and the adjustable governor mechanism are mounted on the insulating panel. The pendulum assembly comprises a centrally apertured collar or sleeve 13, pivotally mounted on a roller bearing 14 fitted over a threaded stud 15, attached to the panel, the collar and associated bearing being restrained against outward movement of the stud by means of a nut 16 adapted for threaded engagement with the free end portion of the stud. The collar 15 is formed with a radial slot 17 to receive the end portion of a flat plate number 18 to which a steel pendulum 19 is secured. The plate member, which may be formed from a non-ferrous metal, is co-extensive in width with the pendulum, and is of sufficient length to provide reinforcement against undue flexing or bending of the pendulum during normal operation of the device. The end portion of the plate may be secured within the slot 17 by soldering or brazing, and the steel pendulum is rigidly attached to the plate by means of rivets 20, as shown. The collar 13 of the pendulum assembly is further formed with a cut-out portion 21 having a flat face 22 adapted to support an adjustable trip screw 23.

The electrical circuit making and breaking arrangement comprises an upper contact button 24 carried by a bronze leaf spring 25, and a lower contact member 26, which is vertically adjustable with respect to its support 27. One end of the spring is secured to a support member 28 by means of screws 29, and the opposite end thereof overhangs the trip screw 23, carried by the collar element of the pendulum assembly. The spring supporting member 28 is L-shaped in cross-section, one leg 30 thereof being secured to the panel, the other leg 31 providing a flat mounting surface for the fixed end of the spring. The lower contact member 26 is attached to the upper end of a pin 32, which is adapted for tight frictional fit in the opening formed between the arms 33 (Fig. 3) of the support member 27, whereby the pin may be vertically adjusted to vary the gap width between the contacts 24 and 26.

The support member 28 is electrically connected to a terminal post 34 by means of a lead 35, and the support member 27 is electrically connected to a terminal post 36 by means of a lead 37, the leads being located on the underside of the panel 11, and having their terminals secured to the screws or other fastening means used to attach the metal support members 27, and 28 to the panel, and to the lower ends of the binding posts 34 and 36 respectively. The terminal posts are in turn electrically connected to the ignition circuit of the engine, by means of leads 38 and 39. The contacts 24 and 26 are normally closed, and accordingly, the circuit through the leads 38 and 39 to one side of the ignition circuit is closed. When the sleeve 13 is angularly disposed with respect to its pivot to the position shown in Fig. 3, the contacts 24 and 26 are separated, and the ignition circuit is opened.

Pivotal movement of the sleeve 13, with resultant opening or closing of the ignition circuit, effected by the oscillation of the steel pendulum 19, which is controlled by the combined forces of gravity and magnetic attraction. As will be seen in Figs. 1 and 3, a pair of permanent magnets 40 and 41 are mounted in spaced relation on the panel, the free end of the pendulum extending into the magnetic fields between the poles of the magnets. The magnets are supported on metal bases 42 which are of sufficient height to bring the pole faces of the magnets into alignment with the faces of the pendulum, and the supporting base 42 of magnet 41 is formed with a vertical arm 43 having a threaded opening therein to receive a set-screw 44, whereby the distance between the inner face of the pendulum and the poles of the magnet may be varied.

The function of magnet 41 is to restrain the pendulum from accidental movement in the direction of the magnet 40, due to jarring or vibration of the vehicle with which the safety control device is associated, and to hold the pendulum against the end of the adjusable stop-screw 44. By appropriate adjustment of the trip screw 23 and the stop-screw 44, the amplitude of the angular displacement of the sleeve 13 necessary to open the contacts 24 and 26, may be varied in accordance with the selected safe operating angle. In connection with the arrangement of the magnets and the oscillatory movement of the pendulum therebetween, it will be understood that when the safe operating angle for which the device has been set is exceeded, the casing is in the tilted position shown in Fig. 3, and as it approaches this position, the gravitational force exerted on the pendulum overcomes the magnetic influence of the holding magnet 41, permitting the pendulum to move into the magnetic field of the magnet 40 and to be pulled into seated engagement with the faces of the poles of this magnet.

It will be appreciated that the pull exerted on the pendulum by the holding magnet 41 decreases as the stop-screw 44 is adjusted inwardly of the bracket 43, and after the screw has been set for a selected operating angle, there is a tendency for the pendulum to swing outwardly from the stop-screw into contact with the magnet 40 before the inclination of the casing becomes greater than the selected operating angle, with the result that the ignition circuit would be prematurely opened. In order to prevent the pendulum from moving into the magnetic field of magnet 40, before the operating angle is reached or exceeded, a governor device is provided to limit the degree of movement of the pendulum during initial tilting of the casing, and to free the pendulum for movement into contact with the magnet 40, as soon as the operating angle is exceeded.

Figure 2:
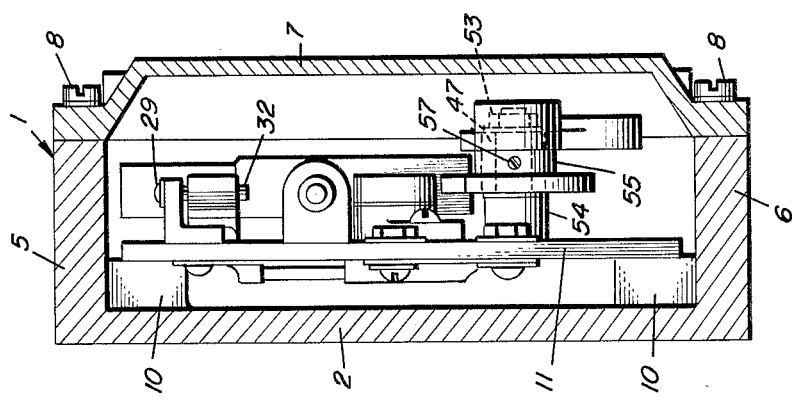
Fig. 2 is a sectional view along line 2—2 of Fig. 1, with the cover positioned on the housing.

Referring to Figs. 2 and 3, the governor 45, together with its associated adjustable cam 46, is pivotally mounted upon a roller bearing 47 fitted over a threaded stud 48 attached to the insulating panel. The governor member comprises a body portion 49 formed with apposed, symmetrically shaped arms 50, and an intermediate arm 51 at right angles thereto, each of the arms terminating in weighted end portions 52. The governor device is retained on the stud 58 by means of a nut 53, and is held in desired spaced relation with respect to the panel by means of a sleeve 54. The cam member 46 is formed with a sleeve portion 55 fitted over the roller bearing 47, and is adapted for angular adjustment with respect to the bearing, whereby the lobe 56 of the cam may be positioned so as to obstruct movement of the pendulum into contact with magnet 40, during the period that the tilt of the vehicle does not exceed the safe operating angle. After the cam has been adjusted, it is retained in fixed position by means of a set-screw 57.

In order to return the pendulum to its initial position, after it has moved into contact with magnet 40, a re-set device is provided, comprising a spring biased plunger 58, slidably mounted on a U-shaped support 59, having apertured ears 60 forming bearings for the plunger and stops for the spring 61 fitted over the plunger. Movement of the plunger against the bias of spring 61 is effected by means of an actuating member 62 slidably mounted in an opening formed in side 5 of the housing, said actuating member having an enlarged base or foot 63 adapted for engagement with a fibre pin 64 seated in the adjacent end of the plunger 58, the opposite end portion 65 of the actuator extending outwardly of the side of the housing. The actuator 62 is preferably formed from metal, and grounding of the electrical circuit of the interrupting device through the plunger 58 is prevented since the plunger is insulated from the actuator by means of the fibre pin 64. When the plunger is moved inwardly of its support 59 by pressing against the end 65', its inner end 66 is forced against the pendulum, and moves the same to the dotted line position shown in Fig. 3. In this connection, it will be noted that if the plunger is actuated as above described, before the vehicle is returned to a safe operating angle, the pendulum will immediately return into contact with magnet 40, thus maintaining the ignition circuit in open condition. Free movement of the pendulum is thus permitted for the reason that when the safe operating angle is exceeded, and until the inclination of the vehicle becomes less than the safe operating angle, the lobe 56 does not obstruct movement of the pendulum.

The safety device is mounted on the vehicle to be protected, by means of bolts, screws or the like, insertable through openings 9' of the lugs or ears 9 formed integral with the housing, with the re-set button or actuator 62 facing the rear of the vehicle and with the bottom 2 of the housing parallel to the vehicle frame. The leads 38 and 39 to the ignition system are then connected in series with the conductor from the ignition switch to the spark coil, or to the oil valve of a diesel engine. Contacts 24 and 26 will remain closed as long as the predetermined safe operating angle of the vehicle is not exceeded. When the vehicle tilts at an angle greater than the safe operating angle, the governor 45, under the influence of gravity, seeks its normal position with respect to the horizontal and carries the cam 46 out of the path of the pendulum 19. The weight of the pendulum overcomes the magnetic influence of the holding magnet 41, and permits the pendulum to swing, with a snap action, into contact with the operating magnet 40, and is held in that position until it is released by actuating the plunger 58 of the re-set device. As the pendulum moves into contact with magnet 40 the trip screw 23, carried by the collar or sleeve 13 of the pendulum assembly, lifts the free end of spring 25, thus separating contacts 24 and 26, and opening the circuit to the ignition system.

After the ignition circuit has been interrupted, as above described, it is impossible, with normal operation of the re-set device, to start the motor until the vehicle is returned to an angle equal to or less than the safe operating angle. In this connection, it will be noted that even though the plunger of the re-set is depressed to force the pendulum away from the magnet 40, the pendulum will immediately return into contact with this magnet. Accordingly, the pendulum cannot be re-set to its normal position in contact with the stop-screw 44, and into the path of the magnetic influence of holding magnet 41, until the cam 46 is moved into obstructing position. This can only be accomplished by returning the vehicle to the safe operating angle.

By means of the above described interlocking sequence, it is impossible for the vehicle to reach the safety shut-down point, and then drop a few degrees, due to its momentum, and start the engine. In case of collision, the force of impact will cause the lobe 56 of cam 46 to move out of the path of the pendulum 19, permitting the pendulum to move into contact with the operating magnet 40, and open the contacts 24 and 26. The vehicle then cannot be operated until the re-set is actuated to return the pendulum to its initial position. The same condition obtains if the vehicle is subjected to sudden shock, as for example, shock due to "bucking the grade," or by reason of careless operation.

The safe operating angle can be selected within the range 0°–90°. If an angle of 30°, for example, is selected, the housing is tilted to the left, as viewed in Fig. 1, to an angle of 30°. The governor 45 is maintained in a horizontal position, and the cam 46 rotated with respect to the governor sleeve 54 until the end of the pendulum 19 clears the lobe 56 of the cam. Stop-screw 44 is then adjusted until the pendulum will just overcome the magnetic influence of the holding magnet 41. Any necessary adjustment of the width of the gap between the contact points 24 and 26 is acomplished by vertical movement of pin 32 with respect to the arms 33 of the support member 27.

In connection with the operation of the device, it will be understood that it is not confined to fore and aft inclination of the vehicle, and that it functions equally well at the selected angle, when tipped sideways towards the cover or back of the housing, or substantially flat on either the cover or the back.

While the device has been described in conjunction with the breaking or opening of a circuit, it will be understood that the present invention comprehends the reverse operation, namely, the closing of a circuit, the particular type of installation depending upon the nature of the ignition circuit which is to be interrupted.

What is claimed:

1. An ignition circuit interrupting device for use with automotive vehicles, comprising a stationary contact and a movable contact connected in series with one side of the vehicle ignition circuit, said movable contact being normally spring biased into circuit closing position, a pendulum assembly, including a pivotal collar and a pendulum supported thereon, means secured to the collar adapted for engagement with the movable contact, a pair of permanent magnets having their pole faces arranged in spaced, apposed relation with respect to the pendulum, the free end portion of the pendulum extending downwardly between the pole faces, and normally retained in circuit closing position by one of the magnets, whereby when the vehicle tilts beyond a predetermined safe operating angle the pendulum moves to circuit opening position under the combined influence of gravity, and the magnetic attraction of the other of said magnets.

2. An ignition circuit interrupting device for use with automotive vehicles, comprising a stationary contact and a movable contact connected in series with one side of the vehicle ignition circuit, said movable contact being normally spring biased into circuit closing position, a pendulum assembly, including a pivotal collar and a pendulum supported thereon, means secured to the collar adapted for engagement with the movable contact, a pair of permanent magnets having their pole faces arranged in spaced, apposed relation with respect to the pendulum, the free end portion of the pendulum extending downwardly between the pole faces, and normally retained in circuit closing position by one of the magnets, and a gravity actuated governor constructed and arranged to obstruct movement of the pendulum during normal operation of the vehicle and to permit free movement of the pendulum to circuit opening position when the vehicle tilts beyond a predetermined safe operating angle.

3. An ignition circuit interrupting device in accordance with claim 2, characterized by the fact that the gravity actuated governor incorporates a cam member, interposed in the path of the pendulum in the vicinity of the free end thereof.

4. An ignition circuit interrupting device in accordance with claim 3, characterized by the fact that the cam member is angularly adjustable with respect to the governor, whereby the safe operating angle of the vehicle may be varied.

5. An ignition circuit interrupting device for use with automotive vehicles, comprising a housing, including a bottom, sides and ends, a mounting plate for the operative elements of the device secured to the bottom of the housing in spaced parallel relationship therewith, said mounting plate being formed from electrical insulating material, a stationary contact and a movable contact carried by the plate, said contacts being connected in series with one side of the vehicle ignition circuit, the movable contact being normally spring biased into circuit closing position, a pendulum assembly, including a collar pivotally mounted on the plate and a pendulum supported on the collar, a pair of permanent magnets secured to the plate and having their pole faces arranged in spaced, apposed relation with respect to the pendulum, the free end portion of the pendulum extending downwardly between the pole faces, and normally retained in circuit closing position by one of the magnets, whereby when the vehicle tilts beyond a predetermined safe operating angle the pendulum moves to circuit opening position under the combined influence of gravity, and the magnetic attraction of the other of said magnets.

6. An ignition circuit interrupting device for use with automotive vehicles, comprising a housing, including a bottom, sides and ends, a mounting plate for the operative elements of the device secured to the bottom of the housing in spaced parallel relationship therewith, said mounting plate being formed from electrical insulating material, a stationary contact and a movable contact carried by the plate, said contacts being connected in series with one side of the vehicle ignition circuit, the movable contact being normally spring biased into circuit closing position, a pendulum assembly, including a collar pivotally mounted on the plate and a pendulum supported on the collar, a pair of permanent magnets secured to the plate and having their pole faces arranged in spaced, apposed relation with respect to the pendulum, the free end portion of the pendulum extending downwardly between the pole faces, and normally retained in circuit closing position by one of the magnets, and a gravity actuated governor constructed and arranged to obstruct movement of the pendulum during normal operation of the vehicle and to permit free movement of the pendulum to circuit opening position when the vehicle tilts beyond a predetermined safe operating angle.

7. An ignition circuit interrupting device in accordance with claim 6, characterized by the fact that the gravity actuated governor incorporates a cam member, interposed in the path of the pendulum in the vicinity of the free end thereof.

8. An ignition circuit interrupting device in accordance with claim 7, characterized by the fact that the cam member is angularly adjustable with respect to the governor, whereby the safe operating angle of the vehicle may be varied.

References Cited in the file of this patent
UNITED STATES PATENTS

| | | |
|---|---|---|
| 2,727,108 | Chisholm | Dec. 13, 1955 |
| 2,734,103 | Raynor | Feb. 7, 1956 |